Patented Feb. 5, 1935

1,989,968

UNITED STATES PATENT OFFICE 1,989,968

PROCESS FOR PREPARING AMIDES

Herman A. Bruson, Germantown, Pa., assignor to
The Resinous Products & Chemical Company,
Philadelphia, Pa.

No Drawing. Application February 3, 1934, Serial
No. 709,595. In Great Britain July 11, 1933.

13 Claims. (Cl. 260—124)

The present invention relates to a process for preparing primary amides of monocarboxylic acids having more than six carbon atoms in the molecule, and is a continuation-in-part of my copending U. S. patent application, Serial No. 676,325, filed June 17, 1933.

The usual known methods for preparing amides by the reaction of ammonia upon acid chlorides or anhydrides, are expensive due to the cost of making the latter. In processes involving the reaction of ammonia with carboxylic acids or esters, good yields of amides have been obtained from the lower aliphatic acids or their esters; but as the molecular size of the acid increases, and more particularly, as the length of the fatty acid chain increases, the yields of amide progressively fall. The high cost consequently of making primary amides of the aliphatic monocarboxylic acids having from about 10 to 18 carbon atoms is disadvantageous for certain uses, such as for example, in the manufacture of soaps or wetting agents. Not only are the yields poorer the longer the chain; but also mechanical difficulties are encountered in separating the amides having upwards of 10 carbon atoms, from the corresponding ammonium salts of the acids which are simultaneously formed in equilibrium therewith, and which act as powerful emulsifying agents. Attempts to remove such ammonium salts by washing with water, invariably lead to the formation of creamy emulsions which are difficult to break; particularly in the case of palmitic, stearic, and oleic amides.

Attempts have been made in the past to force the reaction between the ammonia and the organic acid to go to completion without the formation of residual ammonium salts, by heating the acid in a current of dry gaseous ammonia, or by bubbling ammonia through the acid at high temperatures. It has also been suggested to heat the higher fatty acids with ammonium carbonate or with ammonia under pressure. Such methods necessitate either an expensive ammonia recovery plant or autoclaves for efficient operation; and even under these conditions the decomposition of the ammonium salt of the acid to form the amide is very incomplete especially in the case of the higher fatty acids, having from 10 to 18 carbon atoms in the molecule. It has also been proposed to make amides by heating carboxylic acids with ammonium chloride but the yields are poor and the hydrogen chloride evolved is corrosive to the equipment.

It is furthermore already known that the heating of urea with dicarboxylic acids forms imides instead of primary amides and that certain unsaturated carboxylic acids such as crotonic which have alpha-beta unsaturation in proximity to a carboxyl group yield complex addition products with urea.

According to the present process, amides of monocarboxylic acids having more than six carbon atoms in the molecule, especially fatty acid amides of 10 carbon atoms or more, may be easily and cheaply prepared without the use of ammonia or expensive equipment by simply heating the free carboxylic acid with at least one molecular equivalent of urea, but preferably an excess of urea, at a temperature advantageously between 180° and 250° C. However, these temperature limits are not to be considered inflexible, as the reaction can take place at temperatures as low as 160° C. This requires a longer reaction period of course. There is no advantage in exceeding 250° C. however, as considerable decomposition and charring may occur.

The reaction can be carried out in open kettles at ordinary atmospheric pressure or under a reflux condenser with or without the use of an inert, volatile organic solvent or liquid suspending medium for the components. The amide is formed together with water and cyanuric acid probably according to the equation:

R—COOH+H$_2$N—CO—NH$_2$→
   R—CONH$_2$+H$_2$O+HCNO (polymer)

No emulsions are obtained when the cyanuric acid is washed out with hot water or dilute soda solution, and since the yield of pure isolatable amide is better than 50% of theory, the process consequently is adapted to commercial production of the long chain fatty acid amides. The amides are isolated in the known manner by distillation under reduced pressure or by extraction and crystallization of the reaction product. No ammonia recovery plant or high pressure equipment is required. The cyanuric acid obtained, constitutes a valuable by-product of the process.

As high boiling organic solvents or suspending media for the reaction mass during the condensation, inert substances such as hydrocarbons (p-cymene, amylbenzene, diphenyl) or ethers (diphenyl oxide) may be used in which case the heating can be carried out under a reflux condenser. With acids whose amides are readily formed at lower temperatures the reaction can be carried out in xylene and the water removed as fast as formed by means of the well known automatic water separator which returns the solvent to the reaction vessel but continuously separates and removes the water.

The herein described process is applicable to all monocarboxylic acids containing more than 6 carbon atoms in the molecule which are free from a conjugate system of unsaturated bonds or alpha-beta unsaturation; and which are also free from certain interfering groups or radicals such as hydroxyl, aldehyde, halogen, sulfonic acid, mercapto, or imide-forming groups. The reaction goes readily with aliphatic, aromatic, fatty aromatic, or alicyclic monocarboxylic acids having more than 6 carbons atoms or with ethers of the corresponding hydroxy carboxylic acids, but does not operate well with acids containing any of the above mentioned interfering groups which can combine with urea to produce products other than primary amides. Acids having the formula R—COOH are operative in the present process, where R is a hydrocarbon radical of the aromatic, fatty aromatic, alicyclic, or aliphatic series containing at least 6 carbon atoms, said group R being free from interfering groups or radicals.

The ether acids having the formula R—O—R'—COOH may also be used in this process. In this formula R and R' may be aromatic, aliphatic, fatty aromatic or alicyclic groups. R and R' may be the same in any acid but are not necessarily so. These acids all contain the ether linkage

>CH—O—CH< in which either or both carbon atoms may be one of the atoms of a chain or of a ring group.

As specific examples of such operative acids the following are typical:—

Heptoic, caprylic, lauric, myristic, palmitic, oleic, stearic, amyloxyacetic C$_5$H$_{11}$—O—CH$_2$—COOH, octyloxyacetic C$_8$H$_{17}$—O—CH$_2$—COOH, betahexyloxybutyric C$_6$H$_{13}$—O—CH(CH$_3$)—CH$_2$—COOH, methoxybenzoic, naphthoic, toluic, naphthenic, hexahydrobenzoic, abietic, campholic, phenylacetic, phenoxyacetic, phenoxybenzoic and their homologues. Mixtures of fatty acids which are obtained by the saponification of natural fatty glycerides namely cocoanut oil fatty acids, olive oil fatty acids, cotton seed oil fatty acids and similar mixed fatty acids can also be employed in which case mixed primary amides are obtained.

*Example 1.*—A mixture of 56 grams oleic acid and 50 grams urea was heated in an open vessel with stirring at 200–210° C. for 5 hours. The black mass obtained was washed with warm 5% soda solution and then with hot water, to remove cyanuric acid. The water-insoluble oil was then distilled under reduced pressure. Pure oleic amide came over as a colorless wax, boiling at about 200° C. under 1 mm. pressure, in a yield better than 50% of theory; the remainder being left in the still as an asphalt-like mass. No emulsions whatever were formed during the washing operations.

*Example 2.*—A mixture of 200 grams urea and 200 grams of commercial cocoanut oil fatty acids (containing principally lauric acid mixed with small amounts of decylic, palmitic and stearic acids) was heated with stirring in an open vessel at 190–200° C. for 4½ hours. After removing the cyanuric acid, the residual oil was distilled under reduced pressure. It came over at about 180–200° C./3mm. as a colorless, waxy mass of pleasant tea-like odor. The yield was 60% of theory assuming an average molecular weight of 200 for the cocoanut fatty acids.

*Example 3.*—A mixture of equal weights of urea and stearic acid was heated at 205–210° C. for 5 hours in an open vessel with constant stirring. The product was a black hard wax. It was boiled with xylene to extract the stearamide, and the latter was purified by recrystallization.

*Example 4.*—Capryloxyacetic acid,

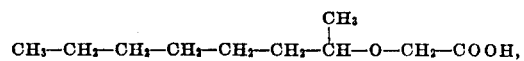

was heated with an equal weight of urea at 180–190° C. for 3–4 hours. After removing the cyanuric acid by extraction with boiling water, the residual oil obtained was distilled in vacuo. The capryloxyacetamide came over at 147° C./2mm. as a colorless oil which gradually crystallized.

In a similar manner, the amides of the monocarboxylic acids enumerated herein can be prepared. The time of heating varies with the size of the batch to some extent, but in general 4 to 6 hours is sufficient.

The term "monocarboxylic acid free from interfering groups" as used in the claims refers to the operative monocarboxylic acids of the type set forth above, which are free from conjugate unsaturated bonds, alpha-beta unsaturation, hydroxyl, halogen, aldehydo (CHO), sulfonic acid, mercapto, imide-forming and similar groups which can combine with urea in an undesirable manner.

The above examples are given by way of illustration only, and are not intended to limit the invention. The process described herein may be carried out with acids other than those specifically mentioned in the examples and which come within the scope of the following claims, in order to obtain primary acid amides of the desired properties.

What I claim is:—

1. The process for preparing primary acid amides comprising heating a molecular excess of urea with mixed fatty acids having from ten to eighteen carbon atoms, inclusive, in the molecule and being free of interfering groups, at an elevated temperature so as to split out water and cyanuric acid, subsequently recovering said amide from the reaction product.

2. The process for preparing primary amides of non-hydroxylated fatty acids having more than eight carbon atoms and which are obtained from the hydrolysis of non-drying fatty glycerides, comprising heating said acids with a molecular excess of urea at elevated temperatures so as to split out water and cyanuric acid and subsequently recovering said primary amide from the reaction product.

3. The process for preparing primary amides of non-hydroxylated fatty acids having more than eight carbon atoms, obtained from the hydrolysis of natural non-drying fatty glycerides, comprising heating said fatty acids with at least one molecular equivalent of urea at a temperature of from 180 to 250° C. and subsequently removing cyanuric acid and other impurities from the reaction product.

4. The process for preparing stearamide comprising heating stearic acid with a molecular excess of urea at a temperature of from 180 to 250° C. and subsequently removing cyanuric acid and other impurities from the reaction mass.

5. The process for preparing oleic amide comprising heating oleic acid with a molecular excess of urea at a temperature of from 180 to 250° C. and subsequently removing cyanuric acid and other impurities from the reaction mass.

6. The process for preparing mixed cocoanut oil fatty acid amides comprising heating the mixed fatty acids of cocoanut oil with a molecular excess of urea at a temperature of from 180 to 250° C., and subsequently removing cyanuric acid and other impurities from the reaction mass.

7. The process for preparing primary acid amides containing more than seven carbon atoms which comprises heating a molecular excess of urea with a monocarboxylic acid having more than seven carbon atoms, and which is free from interfering groups, to a temperature sufficiently high to split out water and cyanuric acid, and recovering said amide from the reaction product.

8. The process for preparing primary acid amides containing more than seven carbon atoms which comprises heating a monocarboxylic acid having more than seven carbon atoms, and which is free from interfering groups, with more than a molecular equivalent quantity of urea, at a temperature of about 160° to 250° C. subsequently separating the cyanuric acid and distilling said amide from the reaction product.

9. The process for preparing primary acid amides containing more than seven carbon atoms which comprises heating a monocarboxylic acid having more than seven carbon atoms and which is free from interfering groups, with more than a molecular equivalent quantity of urea, in an inert, high boiling organic liquid at a temperature sufficiently high to split off water and cyanuric acid.

10. The process for preparing amides of the formula R—CO—NH$_2$ wherein R is a hydrocarbon radical containing more than six carbon atoms, which comprises heating a molecular excess of urea with an acid of the formula R—COOH wherein R is a hydrocarbon radical containing more than six carbon atoms, at a temperature sufficiently high to split out water and cyanuric acid.

11. The process for preparing amides of the formula R—CO—NH$_2$ wherein R is an aliphatic hydrocarbon radical containing at least six carbon atoms, which comprises heating a molecular excess of urea with an acid of the formula R—COOH wherein R is an aliphatic hydrocarbon radical containing at least six carbon atoms, at a temperature sufficiently high to split out water and cyanuric acid.

12. The process for preparing amides of the formula R—CO—NH$_2$ wherein R is a hydrocarbon radical containing more than six carbon atoms which comprises heating an acid of the formula R—COOH wherein R is a hydrocarbon radical of more than six carbon atoms with more than a molecular equivalent quantity of urea at a temperature of from 160° to 250° C.

13. The process for preparing amides of the formula R—CO—NH$_2$ wherein R is an aliphatic hydrocarbon radical containing at least six carbon atoms which comprises heating an acid of the formula R—COOH wherein R is an aliphatic hydrocarbon radical of at least six carbon atoms, with more than a molecular equivalent quantity of urea, at a temperature of from 160° to 250° C.

HERMAN A. BRUSON.